United States Patent
Arai et al.

(10) Patent No.: US 7,068,677 B1
(45) Date of Patent: Jun. 27, 2006

(54) SUBSCRIBER RADIO ACCESS SYSTEM

(75) Inventors: Koji Arai, Kawasaki (JP); Gen Nakagawa, Kawasaki (JP); Kenichi Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/168,449

(22) Filed: Oct. 8, 1998

(30) Foreign Application Priority Data

Oct. 20, 1997 (JP) .................................. 9-287405

(51) Int. Cl.
- *H04L 12/413* (2006.01)
- *H04Q 7/24* (2006.01)
- *H04J 3/12* (2006.01)

(52) U.S. Cl. ................. 370/447; 370/338; 370/528
(58) Field of Classification Search ........ 370/445–448, 370/528, 338, 466, 470–471, 252, 389, 392, 370/465, 229–231, 235–236, 352
See application file for complete search history.

(56) References Cited

U.S. PATENT DOCUMENTS

| | | | | |
|---|---|---|---|---|
| 4,740,992 A | * | 4/1988 | Havens et al. | 375/219 |
| 4,771,391 A | * | 9/1988 | Blasbalg | 364/514 |
| 5,457,684 A | * | 10/1995 | Bharucha et al. | 370/60.1 |
| 6,032,185 A | * | 2/2000 | Asano | 709/227 |
| 6,064,678 A | * | 5/2000 | Sindhushaya et al. | 370/470 |
| 6,118,765 A | * | 9/2000 | Phillips | 370/235 |
| 6,144,641 A | * | 11/2000 | Kaplan | 370/238 |
| 6,178,217 B1 | * | 1/2001 | Defries et al. | 375/377 |
| 6,188,677 B1 | * | 2/2001 | Oyama et al. | 370/271 |
| 6,219,346 B1 | * | 4/2001 | Maxemchuk | 370/338 |
| 6,233,251 B1 | * | 5/2001 | Kurobe et al. | 370/471 |
| 6,341,145 B1 | * | 1/2002 | Hioe et al. | 375/256 |
| 6,370,163 B1 | * | 4/2002 | Shaffer et al. | 370/519 |
| 6,493,335 B1 | * | 12/2002 | Darcie et al. | 370/344 |

FOREIGN PATENT DOCUMENTS

| | | |
|---|---|---|
| JP | 62-226741 | 10/1987 |
| JP | 7-79250 | * 3/1995 |
| JP | 08-335948 | 12/1996 |
| JP | 09-008805 | 1/1997 |
| JP | 9116572 | * 5/1997 |

OTHER PUBLICATIONS

Stallings, Data and Computer Communications, 1997, Prentice Hall, 5th Edition, 190-191.*

* cited by examiner

*Primary Examiner*—Chi Pham
*Assistant Examiner*—Ron Abelson
(74) *Attorney, Agent, or Firm*—Katten Muchin Rosenman LLP

(57) ABSTRACT

A subscriber radio access system in which it becomes possible to facilitate communications for realizing high throughput and by which a radio LAN communication can be realized even if a radio link section is longer according to the CSMA protocol on Ethernet is provided. The subscriber radio access system includes plural transceiver terminals; and a base station linked to each of the plural transceiver terminals via a radio communication channel, wherein one of the plural transceiver terminals communicates to the other transceiver terminal with an Ethernet packet employing a carrier sense multiple access (CSMA) protocol, of which a packet length is corrected to correspond to a transmission delay time between the one and other transceiver.

18 Claims, 9 Drawing Sheets

FIG. 2

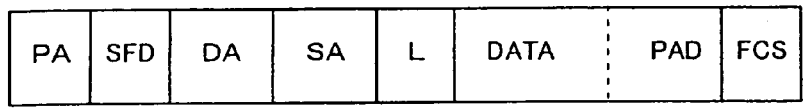

(UNIT: OCTET)

| | | |
|---|---|---|
| PA(Preamble) | (7) | : Preamble section |
| SFD (Start Frame Delimiter) | (1) | : Frame start delimiter |
| DA(Destination Address) | (2 or 6) | : Destination address section |
| SA(Source Address) | (2 or 6) | : Source address section |
| DATA | (48~1500) | : Data section (This section is added when PAD data is not achieved to the minimum frame length (512SYMBOL)) |
| L(Length) | (2) | : Transmitted data length section |
| FCS(Frame Check Sequence) | (4) | : Frame error detecting section |

SUBSCRIBER RADIO ACCESS SYSTEM

BACKGROUND OF THE INVENTION

1. Field of the Invention

The present invention relates to a subscriber radio access system. More particularly, it relates to a subscriber radio access system on Ethernet for linking a radio base station and subscriber terminals through a radio transmission line.

2. Description of the Related Art

In recent years, it has been increased to have chances for using Internet in both of companies and each home because ISDN lines are now widespread among the general public, and providers appear to provide services for Internet with low costs. However, when considering infrastructures for communication in each home, only a telephone line is installed, and therefore, high-speed communications can not be facilitated in each home under the existing condition.

On the other hand, a conception of Fiber to the Home (FTTH) is held among enterprises related to a communication industry. However, a huge infrastructure investment is required, and therefore, it is considered that it will be in about 2010 to completely install the FTTH in each home. In this situation, a subscriber radio access system in which high speed transmission channels can be provided to each home by employing radio transmission channels has been expected much in recent years.

In here, a Point-multi point system for linking one radio base station and a plurality of subscriber terminals is generally employed as the subscriber radio access system. When considering the entire configuration, a cellular zone structure, as used in a mobile telephone system and a cellular phone system, is employed.

When forming a Point to multi-point connection by the use of radio communication, it is general to employ a Time Division Multiple Access (TDMA) system to transmit and receive communication data between the base station and the subscriber terminals with a predetermined frame signal.

In the case of using a TDMA system, it is possible to facilitate communications stably without collision of signals while each subscriber facilitates communications. However, when employing data communication, such as Internet communication in each home, there is much time when the subscriber does not facilitate communications. In this case, each subscriber terminal may keep a certain time interval in a predetermined frame so that transmission speed becomes constant in each subscriber terminal even if a few subscribers facilitate communications.

Accordingly, it is no use because there are many unemployed signal periods on the whole signal transmission. Further, even if the TDMA system can be realized, as it is not standardized currently, each subscriber terminal should be recognized as a special one, thereby increasing the cost and taking much time to expand the system.

To cover the shortage of the above-described problem, a wired LAN is standardized. On Ethernet, which is a bus type network for short distance transmission, i.e., a lower layer protocol in a stack of Transmission Control protocol/Internet protocol (TCP/IP), employed as a typical communication method on LAN, it is effective to employ a method for transmitting and receiving a packet only when facilitating communications according to Carrier Sense Multiple Access (CSMA) protocol.

However, as Ethernet follows a standard of the wired LAN, there is a limited transmission distance to make it possible to detect data collision even if the packet format has a minimum length. For example, in the case of 10 BaseT, i.e., a data communication speed of 10 Mbps employing a twist cable, the maximum length of the cable is limited to 100 m. Therefore, in the case where a radio transmission link section is longer than the limited length, it becomes impossible to detect data collision, thereby not facilitating the data communication.

SUMMARY OF THE INVENTION

Accordingly, it is an object of the present invention to provide a subscriber radio access system in which it becomes possible to facilitate communications for realizing high throughput.

It is an another object of the present invention to provide a subscriber radio access system by which a radio LAN communication can be realized even if a radio link section is longer than the required, according to the CSMA (Carrier Sensor Multiple Access) protocol on Ethernet.

BRIEF DESCRIPTION OF THE DRAWINGS

FIG. 2 shows a frame architecture of a packet transmitted on Ethernet.

DESCRIPTION OF THE PREFERRED EMBODIMENTS

Figure 1:
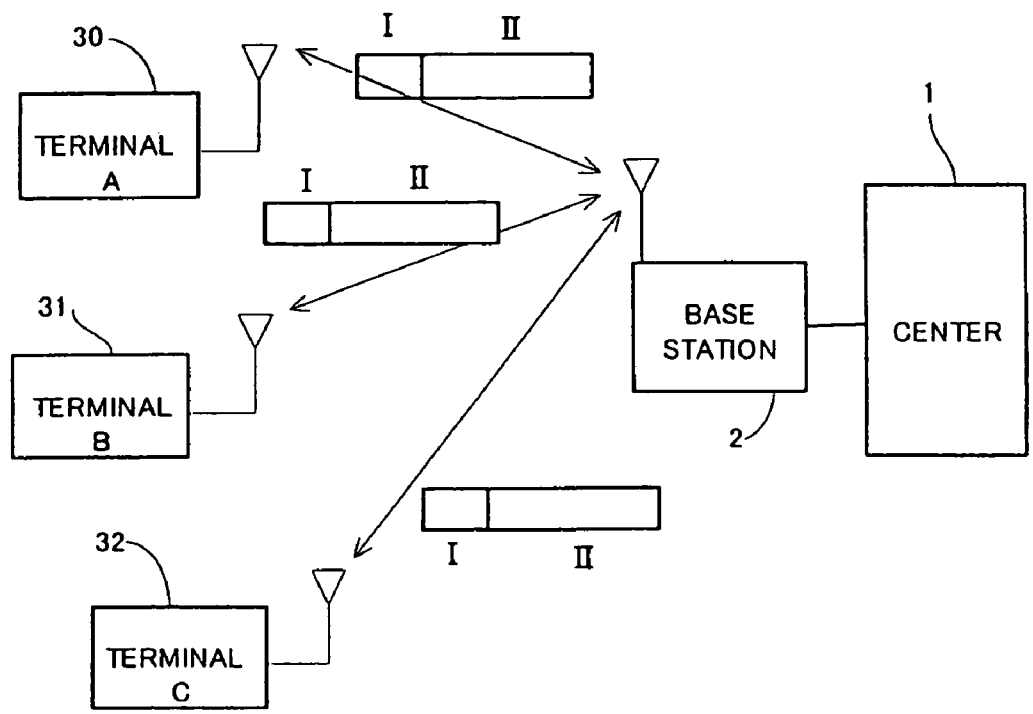
FIG. 1 is an explanatory diagram of a principle of a subscriber radio access system according to the present invention.

Embodiments according to the present invention will be now explained in accompanying with the attached drawings. Throughout the following descriptions, the same reference numerals and symbols are used to denote and identify corresponding or identical components.

Figure 8:
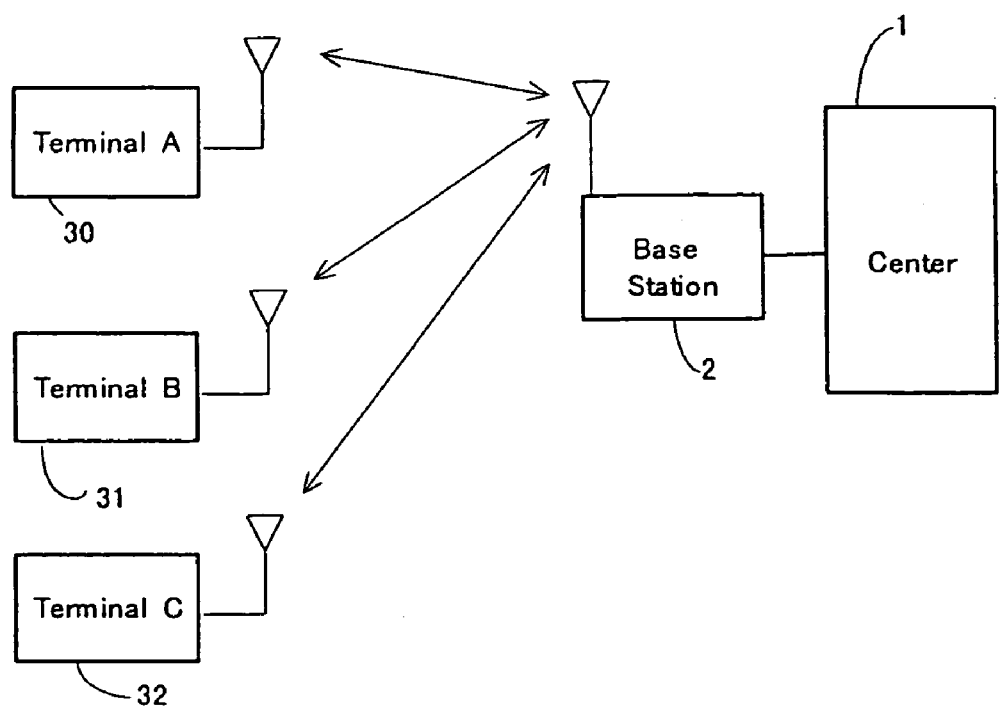
FIG. 8 shows an outline of a subscriber radio transmission system.

An outline of a subscriber radio transmission system is shown in FIG. 8 for better understanding of the present invention before explanations of the present embodiments. A plurality of transceiver terminals (A to C) 30 to 32 within a radio link section are connected by radio transmission channels to a base station 2 linked to a center 1.

Figure 9:
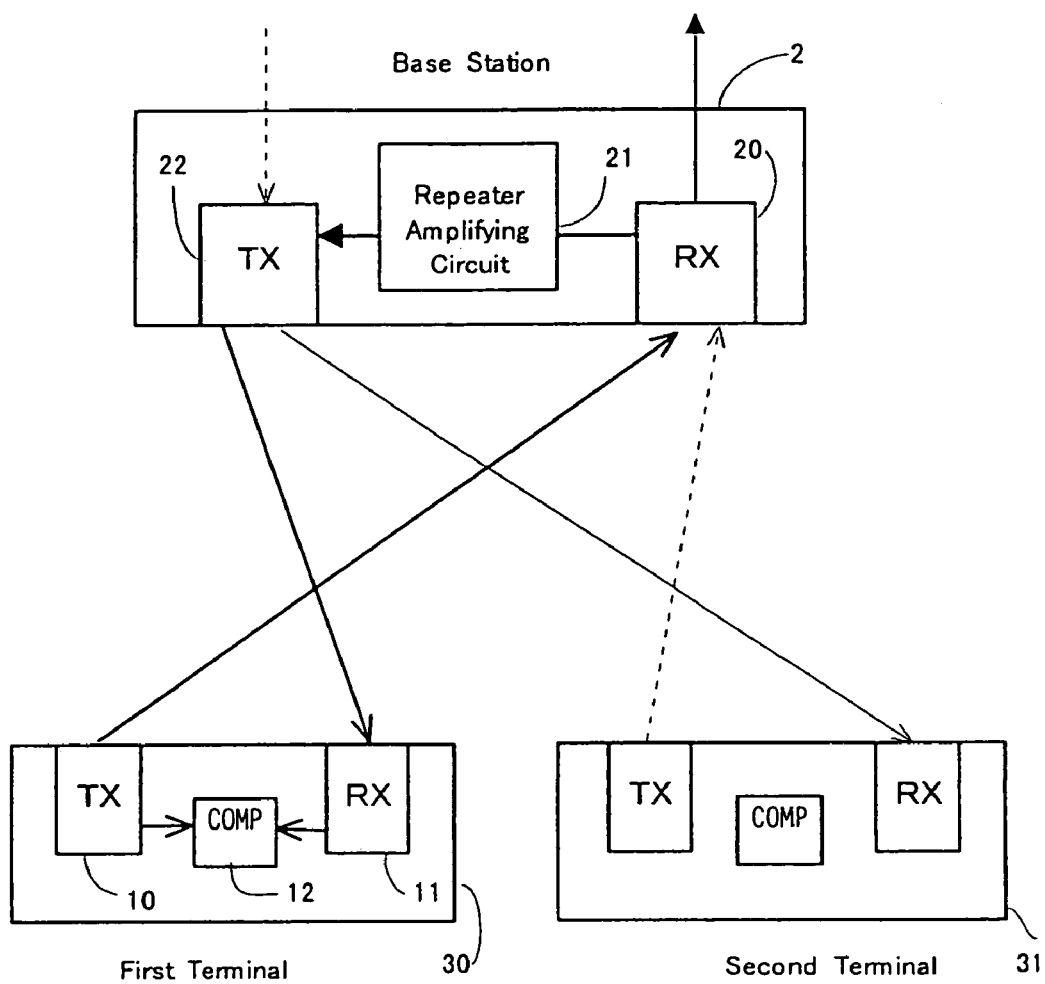
FIG. 9 is an explanatory diagram of data collision detection according to CSMA method on Ethernet.

In this structure, data collision detection according to the above-described CSMA method on Ethernet will be now considered in accompanying with FIG. 9. In FIG. 9, a transmitter TX 10 in a first transceiver terminal 30 transmits a communication request packet to a base station 2.

In general, a receiver RX 20 of base station 2 receives the communication request packet and a transmitter TX 22 returns the packet through a repeater amplifying circuit 21 on base station 2. Therefore, a receiver RX 11 receives the communication request packet returned from base station 2 on the first terminal 30.

Then, a comparing circuit 12 compares the communication request packet transmitted from the own terminal and the communication request packet returned from base station 2 on the first transceiver terminal 30. As the result, if the packet coincides with the returned packet, it is possible to facilitate communications between first transceiver terminal 30 and base terminal 2. On the contrary, if it does not coincide with the returned packet, it is detected that the data collides with other data transmitted from other transceiver terminal or a wired terminal, not shown in FIG. 9, through base station 2, which is illustrated with a dotted line in FIG. 9.

On Ethernet, a shortest packet length of 64 bytes is prescribed as an interval between forward and backward transmission via a transmission medium within a transmission distance to accord with a standard of a delay time for making it possible to detect packet data collision on the transmission medium according to the CSMA protocol. The delay time is an interval between forward and backward transmission in a distance 100 m on the case of employing 10BaseT as described above.

Therefore, in the case where the radio link section is shorter than 100 m, and the delay time of the packet follows the above-described standard, it is possible to detect data from transmitter 22 in base station 2 becomes large, and therefore, an own terminal or the other terminal transmits a next packet even if data collision occurs before detecting the data collision, thereby making it impossible to facilitate communications correctly.

The present invention overcomes such inconvenience as described above. A principle of the present invention will be now explained with FIG. 1. In FIG. 1, a packet communication is facilitated via radio transmission channels between a plurality of transceiver terminals 30 to 31 and base station 2 linked to a center 1, similarly to the structure shown in FIG. 8.

In here, an interval between forward and backward transmission through a transmission medium is found between the end time of a packet transmitted from a transmitting terminal and the arrival time when a header of the packet reaches to a receiving terminal.

Accordingly, in the present invention, dummy bits I are added to a packet II of which length is prescribed according to the CSMA protocol on Ethernet to increase the packet length. Thereby, even if the radio link section is longer than the standard, the data collision can be correctly detected.

FIG. 2 shows a frame architecture of a packet transmitted on Ethernet which is applicable to the present invention. The frame length varies according to the data amount to be transmitted in octet. The frame includes a preamble section PA for establishing bit synchronization in its header. The frame is maximum 1518 octet and minimum 64 octet except a frame start delimiter section SFD.

A frame destination address DA and a source address SA are indicated in the frame. However, each node, i.e., each terminal, is distinguished by Medium Access Control (MAC) address, but not IP address. The MAC address is an ID number employed for transmitting data packet among network nodes according to a lower protocol (Ethernet and so on) of IP (internet protocol) address.

Figure 3:
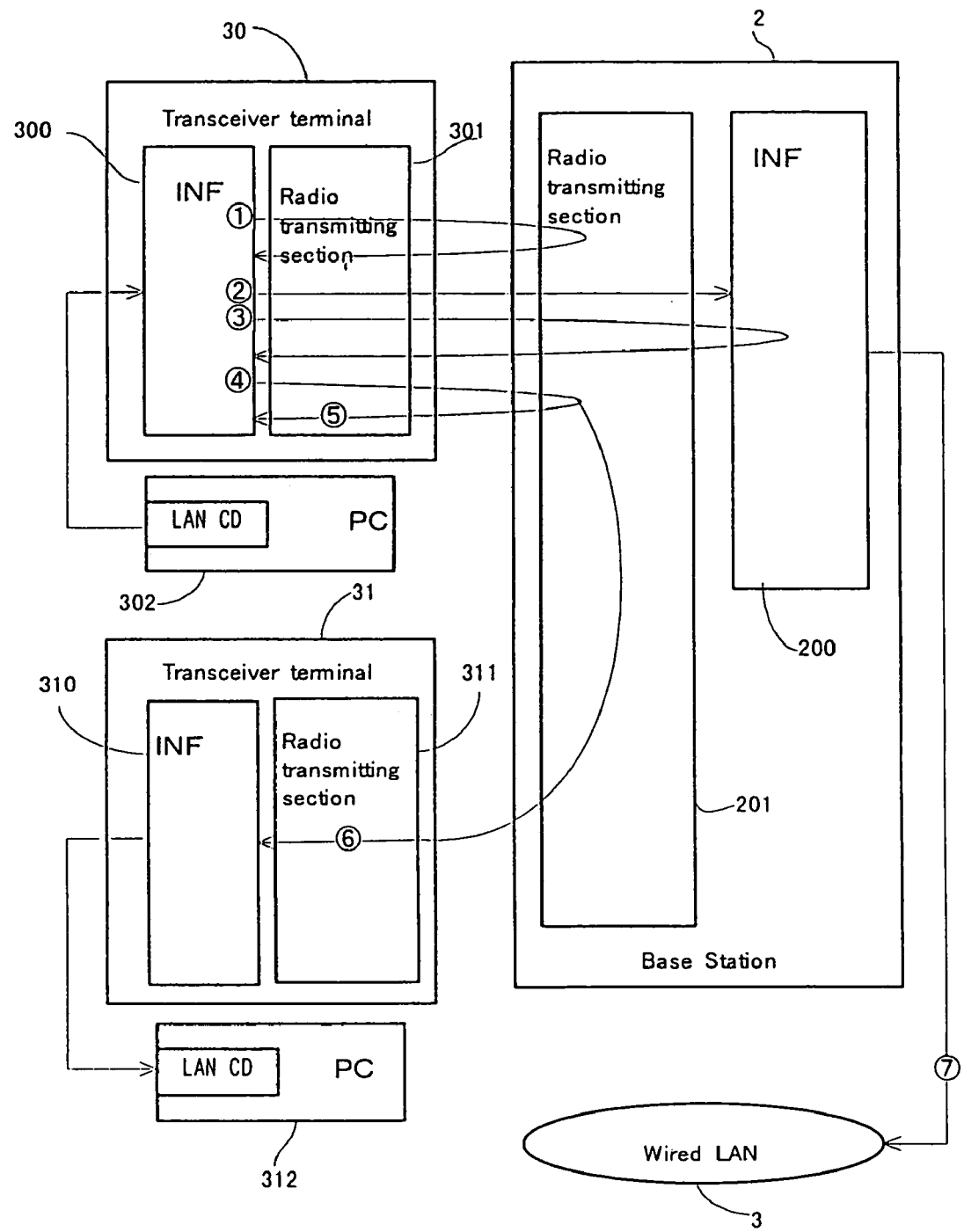
FIG. 3 is a block diagram of a first embodiment according to the present invention.
Figure 4:
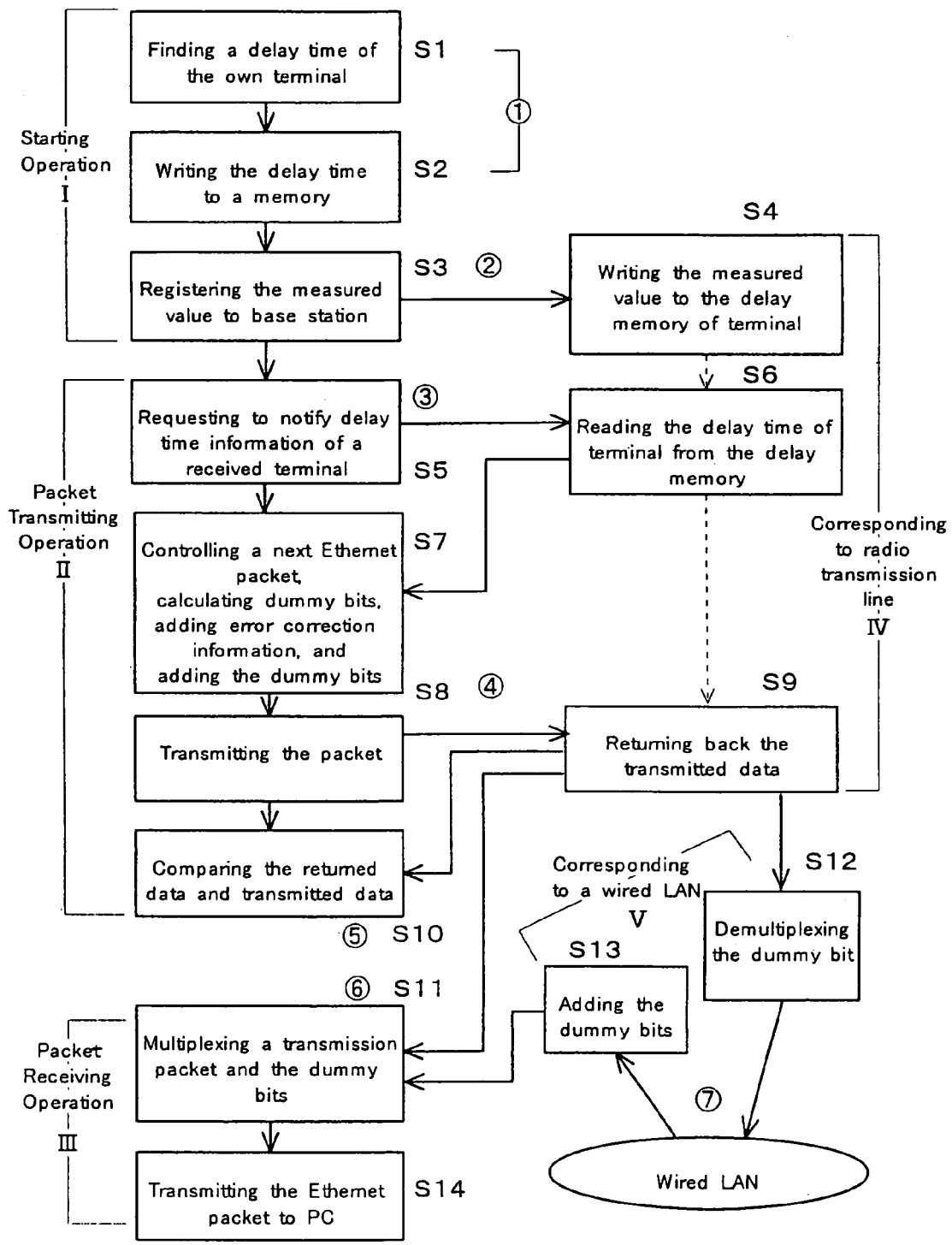
FIG. 4 is an operational flowing chart corresponding to the first embodiment shown in FIG. 3.

FIG. 3 is a block diagram of a first embodiment according to the present invention. FIG. 4 shows an operational flowing chart corresponding to the block diagram of FIG. 3. Same reference numerals in ○ are respectively attached to processing directions corresponding to FIG. 3.

In the embodiment shown in FIG. 3, when a packet is transmitted for long distance transmission according to CSMA protocol, dummy bits are added according to the distance between a transmitter and a receiver in order to detect data collision.

An operation I for starting up is performed as follows: An interface section 300 of terminal 30 reads out a MAC address from a LAN card of a personal computer 302 linked to terminal 30 when the power is ON.

Next, a radio transmitting section 301 transmits a distance measurement packet to find a delay time between transceiver terminal 30 and base station 2 (STEP S1). The measured delay time is used as a memory delay time of the own terminal, and is accumulated in a memory of interface section 300, not shown in FIG. 3 (STEP S2).

Further, the measured and accumulated value is registered to base station 2 as a delay time of the MAC address on the own terminal (STEP S3). Base station 2 accumulates the value as the registered data in a delay memory, of the interface section 200, not shown in FIG. 3 (STEP S4).

Accordingly, each delay time in each MAC address correspondingly registered from each terminal is stored in the delay memory.

As there is a possibility that dummy bits become longer than the packet data, it is required to make the length of the dummy bits I constant. In this case, it may be difficult to detect the data collision within the radio link section.

Therefore, even when the dummy bits I are added as described in FIG. 1 on measuring the delay time of the own terminal, which is described above, an alarm is indicated on each terminal when it is difficult to detect the data collision.

Next, on an operation II for transmitting a packet, when a transceiver terminal 30 receives the Ethernet packet from personal computer PC 302, transceiver terminal 30 searches the communication history from a built-in memory. If the terminal did not facilitate communications to the destination address in the past, transceiver terminal 30 requests base station 2 to notify a delay time information of transceiver terminal 31 to which communication is to be facilitated (STEP S5).

On the contrary, base station 2 reads the delay time of transceiver terminal 31 having the corresponding MAC address from the delay memory and informs it to transceiver terminal 30 (STEP S6). Interface section 300 of transceiver terminal 30 calculates a required delay time from the delay time information transmitted from the base station 2 and the delay time of the own terminal measured in advance according to the following equation:

Required delay time=(delay time of the own terminal)+(delay time between base station and each received terminal):

Further, the length of the dummy bits I is calculated from the calculated required delay time, and the result is added to the Ethernet packet II (STEP S7). Then, the dummy bit includes transmitted packet information and error correction information. The error correction information is for data of the Ethernet packet II.

On the other hand, when there is a history for facilitating communications, the dummy bits including the packet length information and the error correction information are added according to the bit length of the history.

The packet constituted in this way is transmitted through radio transmitting section 301 (STEP S8). In response to this packet, the transmitted data is returned from base station 2 (STEP S9). Therefore, transceiver terminal 30 compares the returned with the transmitted data (STEP S10). As the result, if the returned coincides with the transmitted data, this transmission is successful. If it does not coincides with the transmitted data, it is judged that data collision occurs.

On the comparison of the transmitted data and the received data, it is possible to detect data collision by comparing either of both all bits and only one part of bits.

Next, on an operation III for receiving a packet, the receiving transceiver terminal 31 demultiplexes a transmission packet II and dummy bits I Error correction is executed according to the error correction information in the dummy bits I (STEP S11). Then, the Ethernet packet after error correction is transmitted to the PC 312 (STEP S14).

On the other hand, when the destination is a wired LAN 3 connected through base station 2, base station 2 demultiplexes and removes the dummy bits I added within the radio link section (STEP S12). Therefore, only the Ethernet packet II is transmitted to wired LAN 3.

Further, when the terminals connected to wired LAN 3 transmit data to the radio transmission line, base station 2 adds the required dummy bits I to transmit to radio terminal 31 (STEP S13). Then, the dummy bits I include the packet length information and the error correction information, similarly to the above described.

Figure 5:
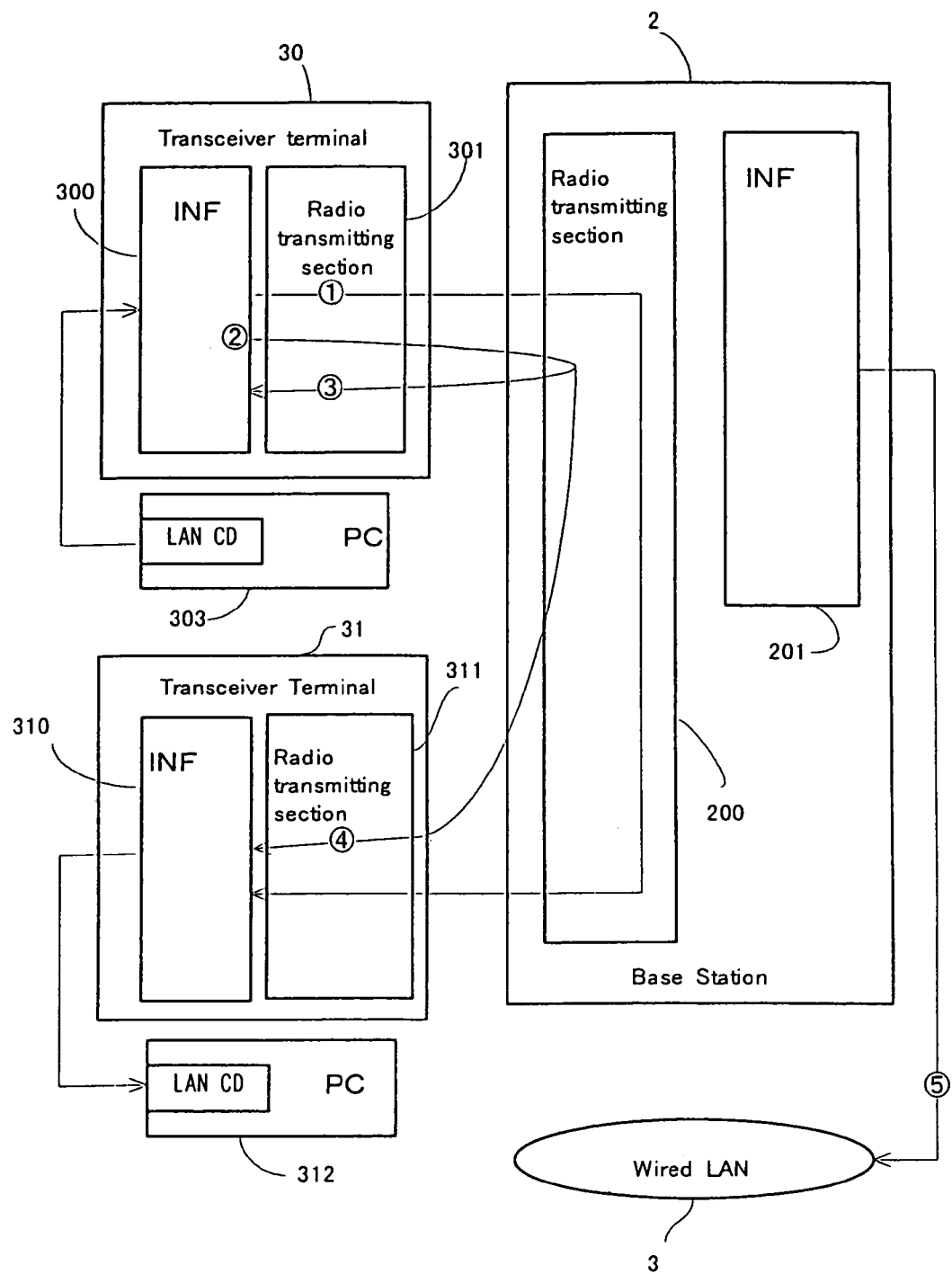
FIG. 5 is a block diagram of a second embodiment according to the present invention.

FIG. 5 shows a second embodiment according to the present invention. It shows an example on transmitting the packet by the radio transmission line for long distance transmission employing the CSMA method according to TCP/IP protocol, as the same as in the embodiment of FIG. 3. In this embodiment, a distance between the transmitting terminal and the receiving terminal is measured by employing a ping command.

The ping command is used for confirming whether or not the IP packet is correctly reached to the destination, which employs an echo function of Internet Control Message protocol (ICMP) to check whether or not the network protocol up to the IP layer works correctly.

The echo data includes an interval time from transmitting to returning the packet. Thereby, it is possible to obtain a delay time for transmitting the packet within the radio link section, as equivalent to the embodiment shown in FIG. 3.

Figure 6:
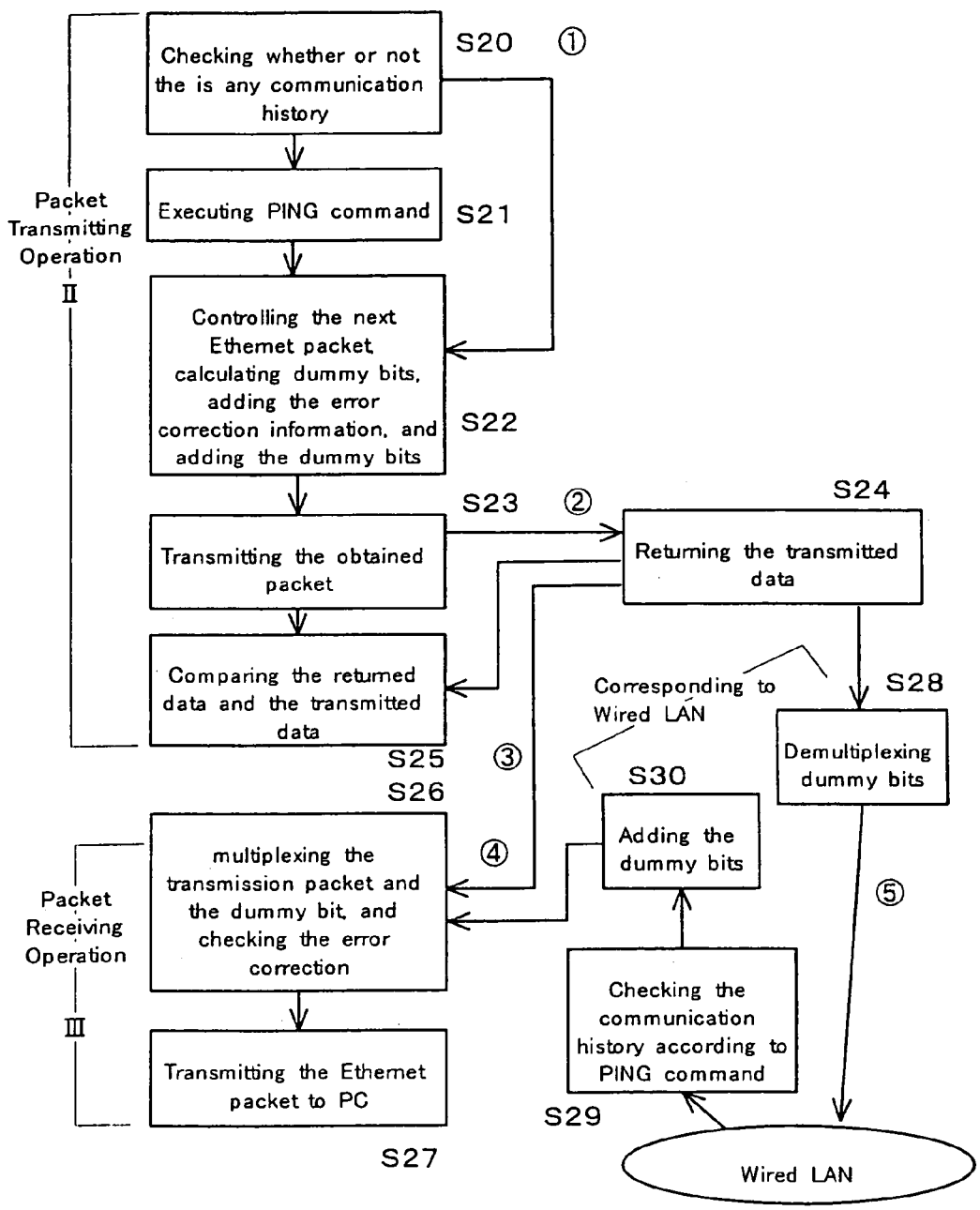
FIG. 6 is an operational flowing chart corresponding to the second embodiment shown in FIG. 5.

FIG. 6 shows an operational flowing chart corresponding to FIG. 5. Same reference numerals in ○ are respectively attached to processing directions corresponding to FIG. 5.

An interface section 300 of transmitting terminal 30 reads out the MAC address from the LAN card of PC 302 connected to transceiver terminal 30, when the power is ON.

Next, transceiver terminal 30 checks whether or not there is any communication history (STEP S20). When there is a communication history, the dummy bits I are added so that a packet has the packet length which is employed in the previous communication to make it possible to detect data collision according to the history information. Further, the error correction information is added to the packet section II as contents of the added dummy bits I (STEP S22).

On the other hand, when it is detected that there is no communication history by checking the above-described ping command is transmitted to the designated transceiver terminal 31 through a radio transmission section 201 of base station 2 to execute it (STEP S21). Thereby, it is possible to know the delay time of the packet according to the echo information transmitted from the designated transceiver terminal 31.

Therefore, the dummy bits I to be added are calculated to be a packet length such that the packet can be reached within the delay time. Further, the error correction information of the data of the packet section II is added as contents of the added dummy bits I, which is similarly to the above-described case (STEP S22).

The packet obtained in this way is transmitted through radio transmission section 301 (STEP S23). In response to the packet, the data transmitted from base station 2 is returned from base station 2 (STEP S24). Therefore, transceiver terminal 30 compares the returned data and the transmitted data (STEP S25). As the result, if the returned back data coincides with the transmitted data, it is judged that the data transmission is successful. On the contrary, if the returned data does not coincide with the transmitted data, it is judged the data collision occurs.

On the comparison of the transmitted data and the received data, data collision can be detected by comparing either of all bits and only one part of the bits, similarly to the embodiment shown in FIG. 3.

Next, on an operation III for receiving a packet, receiving terminal 31 demultiplexes the transmitted packet II and the dummy bits I. Error correction is executed according to the error correction information in the dummy bits I (STEP S26). Then, the Ethernet packet after error correction is transmitted to PC 312 (STEP S27).

On the other hand, when the destination is the wired LAN 3 connected through base station 2, base station 2 demultiplexes and removes the dummy bits I added in the radio link section (STEP S28). Therefore, only the Ethernet packet II is transmitted to wired LAN 3.

Further, when the data is transmitted from terminals connected to wired LAN 3 to the radio transmission line, base station 2 checks whether or not there is a communication history. If there is no communication history, base station 2 sends a ping command to transceiver terminal 30 and executes it (STEP S29).

Then, the required dummy bits I are obtained, and the bits I are added to the Ethernet packet II and is transmitted, similarly to the step S22 (STEP S30).

Figure 7:
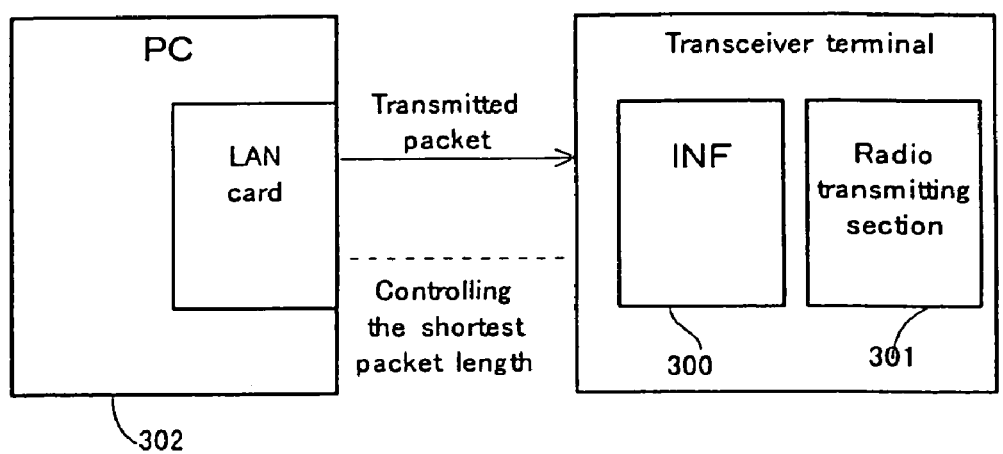
FIG. 7 shows an other embodiment according to the present invention.

FIG. 7 shows still another embodiment according to the present invention. In the above-described embodiments shown in FIGS. 3 and 5, the dummy bits corresponding to the calculated delay time are added.

In the embodiment of FIG. 7, no dummy bit is added. The shortest packet length corresponding to the communication is calculated from the calculated delay time to control a LAN card. That is, after transceiver terminal 30 calculates the delay time on the step S7 of the operational flowing chart shown in FIG. 4 or the step S22 of the operational flowing chart shown in FIG. 6, interface section 300 of transmitting terminal 30 calculates the shortest packet length corresponding to the calculated delay time.

Next, the PC card of PC 302 is controlled such as the transmitted packet length to be the calculated shortest packet length. The length of transmitted packet sent at first from PC 302 is not controlled. Therefore, it is desired to add a preamble section to the packet in this embodiment as needed.

As the embodiments according to the present invention are explained in accompanying with the attached drawings, communications are facilitated only when there is data to be sent. Therefore, even when a few subscribers facilitates communications, it is possible to realize communicates with high throughput.

Further, even when subscriber terminals are added, it is not required to provide any special setting on a base station, as the same as in a LAN system. Therefore, it is easy to start the communication service and give flexibility for the system. A LAN card of the wired LAN can be employed on connecting to the personal computer of the subscriber terminal, and therefore, it is realized to provide a low-priced system.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A subscriber radio access system comprising:
   plural transceiver terminals; and
   a base station linked to each of the plural transceiver terminals via a radio communication channel,
   wherein one of the plural transceiver terminals communicates to another transceiver terminal with an Ethernet packet employing a carrier sense multiple access (CSMA) protocol, of which a packet length is lengthened to correspond to an increase in a transmission delay time actually measured for said one of the plurality of transceiver terminals based on a radio transmission link section between the one and the other transceiver terminals via the base station.

2. A subscriber radio access system comprising:
   plural transceiver terminals; and
   a base station linked to each of the plural transceiver terminals via a radio communication channel over a radio transmission link section,
   wherein one of the plural transceiver terminals communicates to another transceiver terminal with an Ethernet packet employing a carrier sense multiple access (CSMA) protocol, and wherein a packet length of the Ethernet packet is corrected by adding dummy bits to a standard Ethernet packet prescribed by the CSMA protocol, so that the corrected Ethernet packet has a packet length corresponding to transmission delay time actually measured for said one of the plurality of transceiver terminals based on the radio transmission link section between the one transceiver terminal and the base station, and the base station and the other transceiver terminal.

3. A subscriber access system comprising:
   plural transceiver terminals; and
   a base station linked to each of the plural transceiver terminals via a radio communication for registering transmission delay times between each of the plural transceiver terminals and the base station,
   wherein each of the plural transceiver terminals measures and holds a transmission delay time between own terminal and the base station, queries to the base station a transmission delay time between a designated terminal and the base station registered in the base station when transmitting an Ethernet packet employing a carrier sense multiple access (CSMA) protocol to the designated terminal, and adds dummy bits corresponding to the accumulated transmission delay time between the designated terminal and the base station, and the transmitting receiver terminal and the base to correct a packet length of the Ethernet packet.

4. The subscriber radio access system according to claim 2,
   wherein the dummy bits include error correction information as to the Ethernet packet.

5. The subscriber radio access system according to claim 3,
   wherein the dummy bits include error correction information as to the Ethernet packet.

6. A subscriber access system comprising:
   plural transceiver terminals; and
   a base station linked to each of the plural transceiver terminals via a radio communication for registering transmission delay time between each of the plural transceiver terminals and the base station,
   wherein each of the plural transceiver terminals calculates a shortest packet length according to transmission delay time between own transceiver terminal and the base station and a base station and a receiving transceiver terminal, and transmits an Ethernet packet employing a carrier sense multiple access (CSMA) protocol with a packet length longer than the calculated shortest packet length to the receiving transceiver terminal.

7. A subscriber access system comprising:
   plural transceiver terminals; and
   a base station linked to each of the plural transceiver terminals via a radio communication for registering transmission delay times between each of the plural transceiver terminals and the base station,
   wherein each of the plural transceiver terminals measures and holds a transmission delay time between own terminal and the base station, queries to the base station for a transmission delay time between a designated terminal and the base station registered in the base station when transmitting an Ethernet packet employing a carrier sense multiple access (CSMA) protocol to the designated terminal, and calculates a shortest packet length corresponding to the calculated transmission delay time between the designated terminal and the base station, and the transmitting transceiver terminal and the base to form a packet length of the Ethernet packet having a packet length more than the shortest packet length.

8. A subscriber access system comprising:
   plural transceiver terminals; and
   a base station linked to each of the plural transceiver terminals via a radio communication for registering transmission delay time between each of the plural transceiver terminals and the base station,
   wherein each of the plural transceiver terminals measures a transmission delay time between own terminal and a designated terminal by using a ping command when transmitting an Ethernet packet employing a carrier sense multiple access (CSMA) protocol to the destination terminal, and adds dummy bits to make a packet length of the Ethernet packet longer than a shortest packet length corresponding to the measured transmission delay time.

9. A subscriber access system comprising:
   plural transceiver terminals; and
   a base station linked to each of the plural transceiver terminals via a radio communication for registering transmission delay time between each of the plural transceiver terminals and the base station,
   wherein each of the plural transceiver terminals measures a transmission delay time between own terminal and a designated terminal by using a ping command when transmitting an Ethernet packet employing a carrier sense multiple access (CSMA) protocol to the destination terminal, and calculates a shortest packer length corresponding to the measured transmission delay time to make the length of said Ethernet packet longer than said calculated shortest packet length.

10. The subscriber radio access system according to claim 1, wherein each of the plural transceiver terminals records communication history, and when transmitting a next Ethernet packet, the length of the Ethernet packet is corrected according to a transmission delay time in the communication history.

11. The subscriber radio access system according to claim 4, wherein each of the plural transceiver terminals records communication history, and when transmitting a next Ethernet packet, the length of the Ethernet packet is corrected according to a transmission delay time in the communication history.

12. The subscriber radio access system according to claim 8, wherein each of the plural transceiver terminals records communication history, and when transmitting a next Ethernet packet, the length of the Ethernet packet is corrected according to a transmission delay time in the communication history.

13. The subscriber radio access system according to claim 6, wherein each of the plural transceiver terminals records communication history, and when transmitting a next Ethernet packet, the shortest packet length of the Ethernet packet is calculated according to the transmission delay time in the communication history to make the length of the Ethernet packet longer than said calculated shortest packet length.

14. The subscriber radio access system according to claim 7, wherein each of the plural transceiver terminals records communication history, and when transmitting a next Ethernet packet, the shortest packet length of the Ethernet packet is calculated according to the transmission delay time in the communication history to make the length of the Ethernet packet longer than said calculated shortest packet length.

15. The subscriber radio access system according to claim 9, wherein each of the plural transceiver terminals records communication history, and when transmitting a next Ethernet packet, the shortest packet length of the Ethernet packet is calculated according to the transmission delay time in the communication history to make the length of the Ethernet packet longer than said calculated shortest packet length.

16. The subscriber access system according to claim 2,
wherein a wired LAN is further connected to the base station, and
when the Ethernet packet to which dummy bits are added in each of the plural transceiver terminals to correct the packet length is transmitted to the wired LAN via the base station, the added dummy bits are deleted at the base station to transfer the Ethernet packet to the wired LAN.

17. The subscriber access system according to claim 4,
wherein a wired LAN is further connected to the base station, and
when the Ethernet packet to which dummy bits are added in each of the plural transceiver terminals to correct the packet length is transmitted to the wired LAN via the base station, the added dummy bits are deleted at the base station to transfer the Ethernet packet to the wired LAN.

18. The subscriber access system according to claim 8,
wherein a wired LAN is further connected to the base station, and
when the Ethernet packet to which dummy bits are added in each of the plural transceiver terminals to correct the packet length is transmitted to the wired LAN via the base station, the added dummy bits are deleted at the base station to transfer the Ethernet packet to the wired LAN.

* * * * *